United States Patent
Irie

(10) Patent No.: US 9,635,295 B2
(45) Date of Patent: Apr. 25, 2017

(54) IMAGING DEVICE

(71) Applicant: FUJIFILM Corporation, Tokyo (JP)

(72) Inventor: Fuminori Irie, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/867,699

(22) Filed: Sep. 28, 2015

(65) Prior Publication Data
US 2016/0021324 A1 Jan. 21, 2016

Related U.S. Application Data

(63) Continuation of application No. PCT/JP2014/060780, filed on Apr. 16, 2014.

(30) Foreign Application Priority Data

Apr. 26, 2013 (JP) ................... 2013-094656

(51) Int. Cl.
*H04N 5/376* (2011.01)
*G03B 17/18* (2006.01)
(Continued)

(52) U.S. Cl.
CPC ........... *H04N 5/3765* (2013.01); *G03B 17/18* (2013.01); *H04N 5/23222* (2013.01);
(Continued)

(58) Field of Classification Search
CPC ............. H04N 5/3765; H04N 5/23245; H04N 5/23222; H04N 5/2628; H04N 5/23293; H04N 5/3696; H04N 2101/00
See application file for complete search history.

(56) References Cited

U.S. PATENT DOCUMENTS

2006/0244853 A1* 11/2006 Takahashi ............. G06T 3/4007
348/296
2007/0211153 A1* 9/2007 Uchida ............. H04N 5/23293
348/231.99
(Continued)

FOREIGN PATENT DOCUMENTS

JP 2007-243615 A 9/2007
JP 2010-16669 A 1/2010

OTHER PUBLICATIONS

International Search Report, issued in PCT/JP2014/060780, dated Jul. 22, 2014.
(Continued)

*Primary Examiner* — Timothy J Henn
(74) *Attorney, Agent, or Firm* — Birch, Stewart, Kolasch & Birch, LLP

(57) ABSTRACT

The imaging device includes: a first display section that functions as an electronic view finder; a viewing angle setting section that sets a viewing angle of a live view image; a display image generation section that generates a display image which uses the live view image reduced in accordance the viewing angle; a display timing control section; and a blanking time period setting section. The display timing control section synchronizes the image sensor and the first display section in a delay time shorter than a single frame period. The blanking time period setting section sets a blanking time period at the end of the single frame period in accordance with a size of the live view image to be displayed. By completing reading of the imaging signal before start of the blanking time period, synchronization between the timing of driving the image sensor and the timing of performing display on the electronic view finder is maintained.

10 Claims, 14 Drawing Sheets

(51) Int. Cl.
*H04N 5/232* (2006.01)
*H04N 5/262* (2006.01)
*H04N 101/00* (2006.01)
*H04N 5/369* (2011.01)

(52) U.S. Cl.
CPC ..... *H04N 5/23245* (2013.01); *H04N 5/23293* (2013.01); *H04N 5/2628* (2013.01); *H04N 5/3696* (2013.01); *H04N 2101/00* (2013.01)

(56) References Cited

U.S. PATENT DOCUMENTS

| | | | | |
|---|---|---|---|---|
| 2008/0002038 A1* | 1/2008 | Suwa | ............... | H04N 5/23245 348/229.1 |
| 2011/0141318 A1* | 6/2011 | Lee | ............... | H01L 27/14618 348/240.2 |

OTHER PUBLICATIONS

Written Opinion of the International Searching Authority, issued in PCT/JP2014/060780, dated Jul. 22, 2014.

* cited by examiner

IMAGING DEVICE

CROSS-REFERENCE TO RELATED APPLICATIONS

This application is a Continuation of PCT International Application No. PCT/JP2014/060780 filed on Apr. 16, 2014, which claims priority under 35 U.S.C. §119(a) to Japanese Patent Application No. 2013-094656 filed Apr. 26, 2013. The above application is hereby expressly incorporated by reference, in its entirety, into the present application.

BACKGROUND OF THE INVENTION

1. Field of the Invention

The present invention relates to an imaging device having an electronic view finder.

2. Description Related to the Prior Art

Imaging devices such as digital cameras and digital video cameras, which obtain an image of a subject by causing an image sensor to capture the image of the subject formed by an image capture lens, have come into widespread use. Further, camera modules having an image capture lens and an image sensor are generally mounted on electronic devices such as smartphones, mobile phones, PDAs, and tablet terminals. Accordingly, the camera modules also function as imaging devices. In order to determine a photography area (composition) or perform a focusing operation, generally, a view finder is provided in such various imaging devices.

As the view finder, an optical finder that has a finder optical system or an electronic view finder (EVF) that displays an electronic image has been known. The electronic view finder includes a display section that is constituted of a liquid crystal display device and the like, and causes the display section to sequentially display live view images which are captured at a predetermined frame rate and are generated on the basis of imaging signals sent from the image sensor.

The live view display is performed by the electronic view finder through a plurality of kinds of signal processing. The signal processing includes reading of the imaging signal sent from the image sensor, generation of an image based on the read imaging signal, generation of an image to be displayed (i.e., live view image; hereinafter referred to as "display image") which is formed using the generated image, and the like. In each signal processing, reading from a memory and writing processed signals into the memory are performed. Hence, it takes time to perform each signal processing. Therefore, a photographed image (an image acquired in response to an input of a photography instruction) is not completely displayed in real time, and generally an image, which is previous by one to several frames, is displayed with a delay. Hence, if a subject with a large motion is intended to be photographed, a photo opportunity may be missed.

In view of the above situation, recently, there is a known imaging device capable of performing live view display substantially in real time by not separately driving the image sensor and the display section, but driving those in synchronization at a predetermined phase difference and by restricting the display delay of the electronic view finder within a single frame period (US 2007/0211153 A1 corresponding to JP2007-243615A).

However, a field of view (a size of a displayed live view image) of the finder is one of the important factors that determine the usability of the finder. For example, if the live view image is excessively small, the image is less realistic. If the live view image is excessively large, it is necessary for a user to move a point of view location in order to view the entire image. Therefore, it takes time to check the image, and thus photo opportunity may be missed. Hence, as an imaging device employing a recent electronic view finder, there is a known imaging device capable of changing a display size of a live view image (JP2010-016669A)

When an electronic view finder is employed as a view finder of an imaging device, it is preferable that a display delay of a live view image is minimized and a display size of a live view image is set to be changeable. Hence, it can be considered that a technology of suppressing a delay of the display of a live view image according to US 2007/0211153 A1 and a technology of changing a display size of a live view image according to JP2010-016669A are used in combination. However, when the display delay is reduced in a method described in US 2007/0211153 A1, there is a problem in that the display size of the live view image cannot be reduced.

Specifically, in US 2007/0211153 A1, the display delay is minimized by sequentially displaying images of lines (lines of pixels of the image sensor), at which reading of the imaging signals is completed, on lines of display pixels corresponding one-to-one therewith without waiting for completion of reading of the imaging signals for each screen from the image sensor. As described above, when the image sensor and the display section are synchronously controlled, if the live view image is intended to be reduced in the display size and to be displayed at the center of the display screen, reading of the imaging signal at the last line (the lowest line of the live view image) of the image sensor is delayed in displaying.

Consequently, when the image sensor and the display section are synchronously controlled as disclosed in US 2007/0211153 A1, if the live view image is intended to be reduced and displayed, the image sensor and the display section are not synchronized. Thus, it is necessary to increase the display delay such that the time period of the reading of the imaging signals is appropriate for the timing of displaying the live view image.

SUMMARY OF THE INVENTION

An object of the present invention is to provide an imaging device which has less display delay of a live view image and is able to change a display size of the live view image.

An imaging device of the present invention includes an image sensor, a signal processing section, an electronic view finder, a viewing angle setting section, a display image generation section, a display timing control section, and a blanking time period setting section. The image sensor captures an image of a subject and outputs an imaging signal for generating a single live view image for each single frame period. The signal processing section generates the live view image on the basis of the imaging signal. The electronic view finder has a display screen with a predetermined size and displays the live view image on the display screen. The viewing angle setting section sets a viewing angle for the subject displayed on the display screen of the electronic view finder. The display image generation section generates a live view image which is reduced and displayed on the display screen on the basis of the set viewing angle. The display timing control section synchronizes timing of performing display on the electronic view finder with timing of driving the image sensor in a delay time shorter than a single frame period, and sequentially displays the live view images on the display screen. The blanking time period setting section sets a blanking time period corresponding to the set viewing angle at the end of the single frame period. The blanking time period setting section completes reading of the imaging signal before start of the blanking time period, and completes the reading of the imaging signal before timing at which the display image generation section uses the imaging signal, thereby maintaining synchronization between the timing of driving the image sensor and the timing of performing display on the electronic view finder.

It is preferable that the blanking time period setting section maintains synchronization between the image sensor and the electronic view finder by reducing a time period of reading the imaging signal in accordance with the blanking time period.

It is preferable the blanking time period setting section sets the blanking time period by performing thinning-out reading which thins out and outputs the imaging signals from the image sensor so as to reduce the time period of reading the imaging signal. In this case, it is preferable that the blanking time period setting section performs the thinning-out reading in units of lines of a plurality of arranged pixels.

The blanking time period setting section may set the blanking time period by increasing an operation clock of a circuit for reading the imaging signal so as to reduce the time period of reading the imaging signal. Further, the blanking time period setting section may set the blanking time period by reducing a data bit length of the imaging signal so as to reduce the time period of reading the imaging signal. Furthermore, the blanking time period setting section may set the blanking time period by performing pixel mixture reading, which reads mixture of signals of two or more pixels, so as to reduce the time period of reading the imaging signal.

The blanking time period setting section may set the blanking time period by extending the single frame period.

It is preferable that the blanking time period setting section reduces a time period of reading the imaging signal through combination between extending of the single frame period and at least one of thinning-out reading, increasing of an operation clock, reducing of a data bit length of the imaging signal, and pixel mixture reading. In addition, it is preferable that, in the case where a plurality of photography modes is provided in advance, the combination between the extending of the single frame period and at least one of the thinning-out reading, the increasing of the operation clock, the reducing of the data bit length of the imaging signal, and the pixel mixture reading is set in advance for each of the photography modes.

It is preferable that, in the case where a state that the live view image is displayed on the display screen in a full screen mode is switched to a state that the live view image is reduced and displayed on the display screen, in at least one frame previous to the frames for displaying the reduced and displayed live view image, mask data for indicating a region for the reduced and displayed live view image is superimposed and displayed on the live view image with a full screen size.

In the imaging device of the present invention, if the live view image is reduced and displayed, a blanking time period (a time period in which reading is not performed) is provided in an operation for reading the imaging signal, and reading of the imaging signal is completed at least before the imaging signal is used in the generation of the display screen. Therefore, synchronization between the image sensor and the display section is maintained, and the display delay is minimized. In addition, the live view image may be reduced and displayed.

BRIEF DESCRIPTION OF DRAWINGS

For more complete understanding of the present invention, and the advantage thereof, reference is now made to the subsequent descriptions taken in conjunction with the accompanying drawings, in which.

DESCRIPTION OF THE PREFERRED EMBODIMENTS

Figure 1:
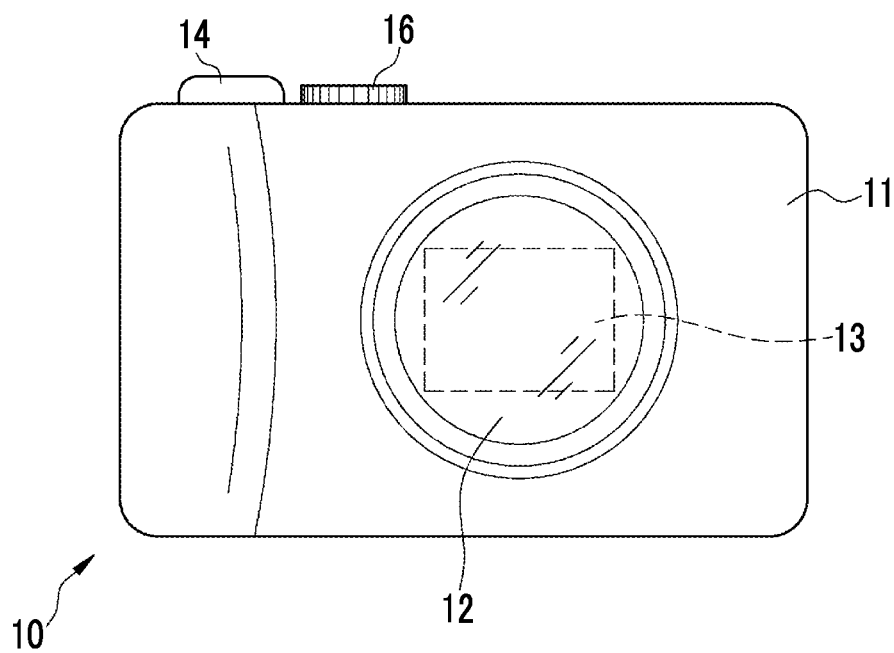
FIG. 1 is a front view of an imaging device.

In FIG. 1, an imaging device 10 is a digital camera including: a main body 11 into which an image sensor 13 and the like are built and which has a substantially rectangular parallelepiped shape; and an image capture lens 12 which is mounted on the front surface of the main body 11. The imaging device 10 causes the image capture lens 12 to form an image of a subject on the image sensor 13, causes the image sensor 13 to capture the image of the subject, and generates a photographed image of the subject on the basis of the imaging signals which are output from the image sensor 13. For example, a photography instruction input switch 14 which is for inputting a photography instruction, a mode switch dial 16 which is for switching between a plurality of photography modes provided in advance, and the like are provided on the upper surface of the main body 11.

Figure 2:
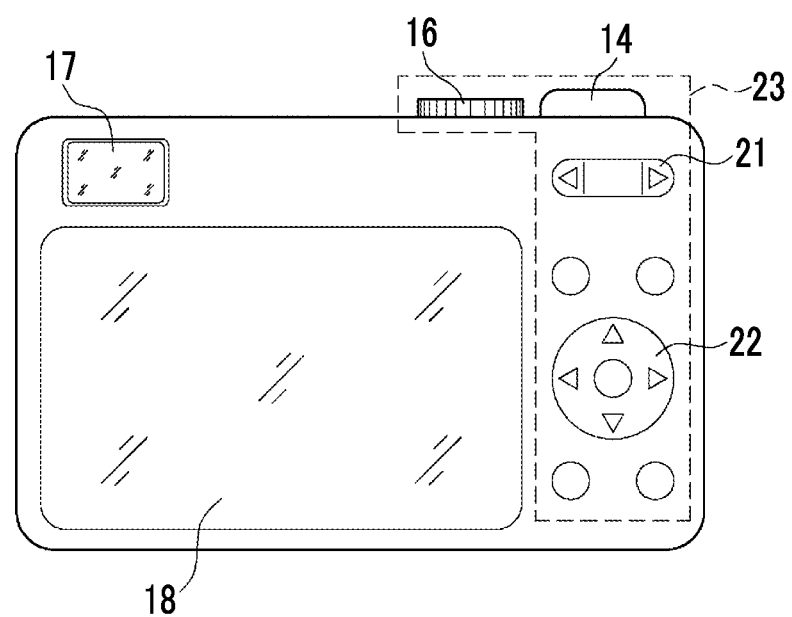
FIG. 2 is a rear view of the imaging device.

In FIG. 2, a first display section 17, a second display section 18, a zoom button 21, a multi-function button 22, and the like are provided on the rear surface of the main body 11.

The first display section 17 is a small-sized display device that displays a live view image substantially in real time, and is an electronic view finder that is used to check a photography area and perform a focusing operation. The live view image is generated on the basis of the imaging signals which are sequentially output at a predetermined frame rate by the image sensor 13. The first display section 17 is formed of a display device 17a such as a liquid crystal display, an eyepiece lens 17b, an observation port 17c (refer to FIG. 3), and the like. A user is able to perform observation by viewing the live view image, which is displayed on the display device 17a, through the eyepiece lens 17b from the observation port 17c.

The second display section 18 is a liquid crystal display having a display screen of which the size is larger than that of the first display section 17, and displays previously photographed images or a menu screen for performing various kinds of setting of the imaging device 10. On the basis of the setting, instead of the first display section 17 (or together with the first display section 17) the imaging device 10 may cause the second display section 18 to function as an electronic view finder. In the present embodiment, the first display section 18 is used as an electronic view finder.

The zoom button 21 is an operation button which is used in zoom control for changing a focal length of the image capture lens 12. The multi-function button 22 is an operation button which is used in selecting and determining a photographed image or a menu displayed on the second display section 18. The zoom button 21 and the multi-function button 22 constitute an operation section 23, together with the photography instruction input switch 14 and the mode switch dial 16.

Figure 3:
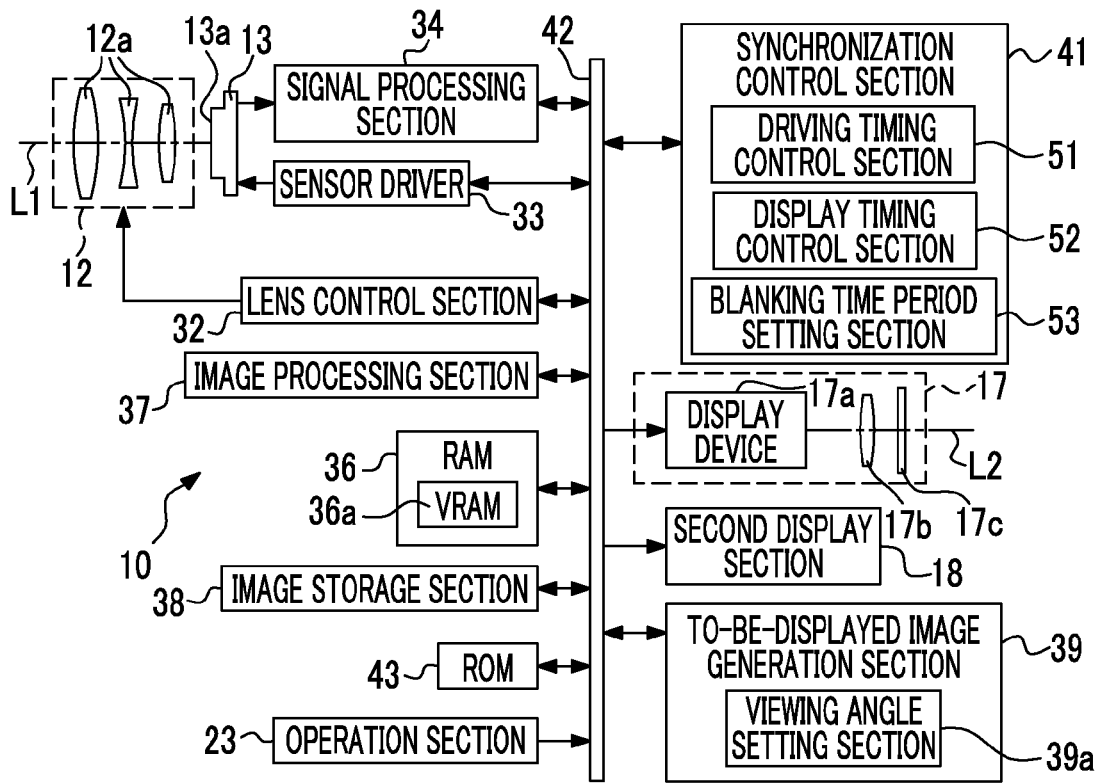
FIG. 3 is a block diagram of the imaging device.

In FIG. 3, the image capture lens 12 has a plurality of lenses 12a. The plurality of lenses 12a includes: a lens (lens group) that moves along the optical axis L1 in order to adjust the focal length; a focusing lens (lens group) that moves along the optical axis L1 in order to perform focus adjustment; and various driving mechanisms that are for driving the lenses.

The plurality of lenses 12a also includes: a correction lens that is provided to be movable in a direction perpendicular to the optical axis L1 so as to move in a direction of canceling hand shaking; an aperture stop that is for adjusting an exposure amount; and the like. In addition, although FIG. 3 shows three lenses as the image capture lens 12, the number of lenses may be arbitrary, and the image capture lens may include optical elements such as various optical filters other than the lenses, a lens that substantially has no power, and the like.

The imaging device 10 includes not only the image capture lens 12, the image sensor 13, the operation section 23, but also includes a lens control section 32, a sensor driver 33, a signal processing section 34, a RAM 36, an image processing section 37, an image storage section 38, a display image generation section 39, a synchronization control section 41, and the like. The respective sections of the imaging device 10 are connected to each other through a bus 42. Further, some of the respective sections of the imaging device 10 are implemented as functions of a CPU which is not shown, and control programs, setting data, and the like to be used are stored in the ROM 43 in advance.

The lens control section 32 adjusts the focal length of the image capture lens 12 on the basis of a zoom signal which is input from the operation section 23 through an operation performed on the zoom button 21. Further, if a photography mode for automatically performing focus adjustment is set, the lens control section 32 performs focus adjustment (focusing operation) by adjusting a position of the focusing lens on the basis of a focus evaluation value which is input from the signal processing section 34. In addition, the lens control section 32 also adjusts an aperture ratio of the aperture stop and the like.

The image sensor 13 is disposed behind the image capture lens 12 such that an image capture surface 13a thereof faces the image capture lens 12. The image capture surface 13a is a region in which a plurality of pixels is two-dimensionally arranged. The image of the subject is formed on the image capture surface 13a. The image sensor 13 captures an image by performing photoelectric conversion on the formed image of the subject for each pixel, and outputs an imaging signal for each pixel line.

The image sensor 13 sequentially outputs the imaging signals at a predetermined frame rate ($1/T_{F1}$) which is set in advance. The frame rate ($1/T_{F1}$) is, for example, 60 fps. The imaging signals, which are output at the frame rate ($1/T_{F1}$), are used in the generation of the live view image. Further, the imaging signals, which are output when a photography instruction is input through an operation (an operation of pressing photography instruction input switch 14) of the operation section 23, are used in the generation of a photographed image to be stored.

The image capture surface 13a also includes pixels (for example, shaded pixels) which do not contribute to image capturing of the subject. An effective pixel region, which contributes to the image capturing of the subject, in the image capture surface 13a is a rectangular region which includes the center of the image capture surface 13a. In the present embodiment, the image sensor 13 is a CMOS type, but may be a CCD type.

The sensor driver 33 controls operations of the image sensor 13. For example, in accordance with the setting, the followings are controlled: the frame rate ($1/T_{F1}$) that is for outputting the imaging signals for the live view image; an imaging signal reading method (thinning-out reading or pixel mixture reading); a shutter speed (exposure time) for capturing a photographed image to be stored; and the like. In addition, the sensor driver 33 controls the frame rate ($1/T_{F1}$) by outputting the imaging signals for the live view image with a certain time interval on the basis of a driving timing signal which is input from a driving timing control section 51.

The signal processing section 34 is an image engine that generates image data (photographed images and live view images) by applying various kinds of signal processing such as demosaic processing to the imaging signals which are output by the image sensor 13. The image data generated by the signal processing section 33 is temporarily stored in the RAM 36.

The signal processing section 34 detects an optimal white balance value on the basis of the input imaging signals in accordance with the setting, and adjusts the white balance value of the image data. Further, the signal processing section 34 calculates a focus evaluation value by using the input imaging signals. The detected white balance value and the focus evaluation value are input to the lens control section 32, and are used in auto-focus adjustment and adjustment of an exposure amount (an aperture ratio of the aperture stop).

When the image data generated by the signal processing section 34 is a photographed image to be stored, the photographed image stored in the RAM 36 is read and subjected to various kinds of image processing such as 7 correction processing and gray scale conversion processing by the image processing section 37, and thereafter the image is stored in an image storage section 38. In contrast, when the image data generated by the signal processing section 34 is a live view image, the live view image stored in the RAM 36 is read by the display image generation section 39, and is used in generation of a display image to be displayed on the first display section 17.

The display image generation section 39 enlarges or reduces the live view image, which is read from the RAM 36, in accordance with the size of the display screen of the first display section 17, thereby generating a display image. Further, the display image generation section 39 may generate a display image in which the live view image is applied to a region which is reduced in size relative to the size of the display screen of the first display section 17. In this case, the periphery of the live view image, which is reduced to be smaller than the screen size, is filled with blank data (for example, black data). Hence, the first display section 17 displays the live view image on the center portion of the display screen. The display image generation section 39 includes a viewing angle setting section 39a for adjusting a viewing angle of the live view image.

The viewing angle setting section 39a sets a viewing angle of the live view image (subject) displayed on the first display section 17, on the basis of the operation input and the like performed through the operation section 23 and the like. Specifically, the setting of the viewing angle performed by the viewing angle setting section 39a is performed by designating the display size (a reduction percentage thereof in relation to the display screen) of the live view image in the display image. The viewing angle (a reduction percentage) of the live view image can be arbitrarily changed. Further, although the display position of the reduced and displayed live view image can also be arbitrarily changed, in the present embodiment, the live view image is reduced and displayed at the center of the display screen of the first display section 17. In addition, the display image generation section 39 may superimpose characters, signs, and indicators, which indicate setting parameters of the photography mode selected in advance and the like, on the display image.

The display image generated by the display image generation section 39 is temporarily stored in a VRAM 36a. The VRAM 36a is a memory region for temporarily storing the display image, and is reserved in the RAM 36 in advance. It is apparent that the VRAM 36a may be provided separately from the RAM 36. The display images stored in the VRAM 36a are sequentially read by and displayed on the display device 17a of the first display section 17 used as an electronic view finder. In a case of the setting in which the second display section 18 is used as an electronic view finder, the display image is read by and displayed on the second display section 18.

The synchronization control section 41 includes the driving timing control section 51, a display timing control section 52, and a blanking time period setting section 53, and controls synchronization between operation timing of the image sensor 13 and operation timing of the first display section 17.

The driving timing control section 51 generates the driving timing signal for controlling the timing of driving the image sensor 13, and inputs the signal to the sensor driver 33. The sensor driver 33 outputs the imaging signals for the live view image at the frame rate ($1/T_{F1}$) determined by the input driving timing signal.

The display timing control section 52 generates a display timing signal for controlling display timing of the first display section 17 in accordance with the setting of the display size of the live view image, and inputs the signal to the first display section 17 (display device 17a). The first display section 17 reads the display image from the VRAM 36a in response to the input display timing signal, and displays the image. The display timing signal is synchronized as a predetermined delay time (phase difference) with the driving timing signal. Hence, the display frame rate of the first display section 17 is equal to the driving (image capturing) frame rate ($1/T_{F1}$) of the image sensor 13. In addition, in the case of the setting in which the second display section 18 is used as an electronic view finder, the display timing control section 52 inputs the display timing signal to the second display section 18.

The display timing control section 52 sets a delay time of the display timing signal relative to the driving timing signal as $\Delta Ta$ or $\Delta Tb$. When the first display section 17 displays the live view image in a full screen mode, the delay time $\Delta Ta$ is a shortest time lag for normally storing (writing) the displayed image in the VRAM 36a through the display image generation section 39 and normally reading the displayed image from the VRAM 36a through the first display section 17. The delay time is shorter than a single frame period $T_{F1}$ in which the image sensor 13 performs an operation for reading the imaging signals for one screen.

When the first display section 17 reduces the size of the live view image and displays the image and the blanking time period setting section 53 does not set a blanking time period $T_{BL}$, the delay time $\Delta Tb$ is a time lag for normally storing (writing) the displayed image in the VRAM 36a through the display image generation section 39 and normally reading the displayed image from the VRAM 36a through the first display section 17. The delay time $\Delta Tb$ is set to be longer than the delay time $\Delta Ta$, and to be shorter than the single frame period $T_{F1}$ ($T_{F1} > \Delta Tb > \Delta Ta$).

The delay time $\Delta Tb$ is set only in a case where it is difficult to cause the first display section 17 or the image sensor 13 to perform an operation appropriate for the blanking time period $T_{BL}$ due to restrictions based on specification. Even when the first display section 17 reduces the size of the live view image and displays the image, the first display section 17 or the image sensor 13 may be caused to be able to perform the operation appropriate for the blanking time period $T_{BL}$. In this case, the display timing control section 52 sets the delay time as $\Delta Ta$, and maintains the setting in the case where the live view image is displayed in a full screen mode.

When the first display section 17 reduces the size of the live view image and displays the image, the blanking time period setting section 53 sets the blanking time period $T_{BL}$, in which the reading operation is not performed, in the single frame period $T_{F1}$. A length of the blanking time period $T_{BL}$ is calculated depending on the viewing angle (reduction percentage) of the live view image.

The blanking time period setting section 53 inputs a parameter, which is for changing the setting of the method of reading the imaging signals from the image sensor 13, to the sensor driver 33 in order to complete the reading of the imaging signals for each screen in a time period ($T_{F1} - T_{BL}$) which is obtained by subtracting the blanking time period $T_{BL}$ from the single frame period $T_{F1}$. If the parameter for setting the reading method is input from the blanking time period setting section 53, the sensor driver 33 performs reading of the imaging signals from the image sensors 13 in the reading method corresponding to the parameters.

For example, the blanking time period setting section 53 inputs a parameter, which is for setting the number of lines for thinning-out reading, to the sensor driver 33 in accordance with the length of the set blanking time period $T_{BL}$, and thins out and performs operations for reading the imaging signals, each of which is performed for each line, at predetermined intervals, for example, reads the imaging signals for every other line or every third line. Thereby, in the reading time period ($T_{F1}-T_{BL}$) which excludes the blanking time period $T_{BL}$, reading of the imaging signals for each screen is performed.

Figure 4:
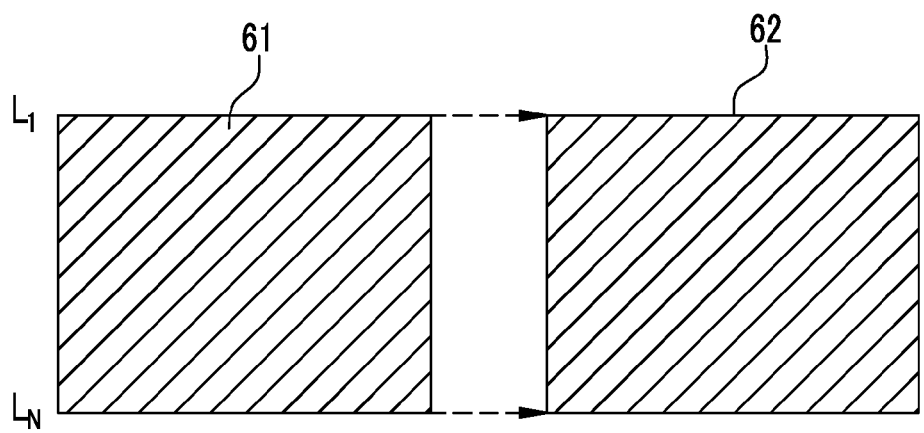
FIG. 4 is an explanatory diagram of full screen display.
Figure 5:
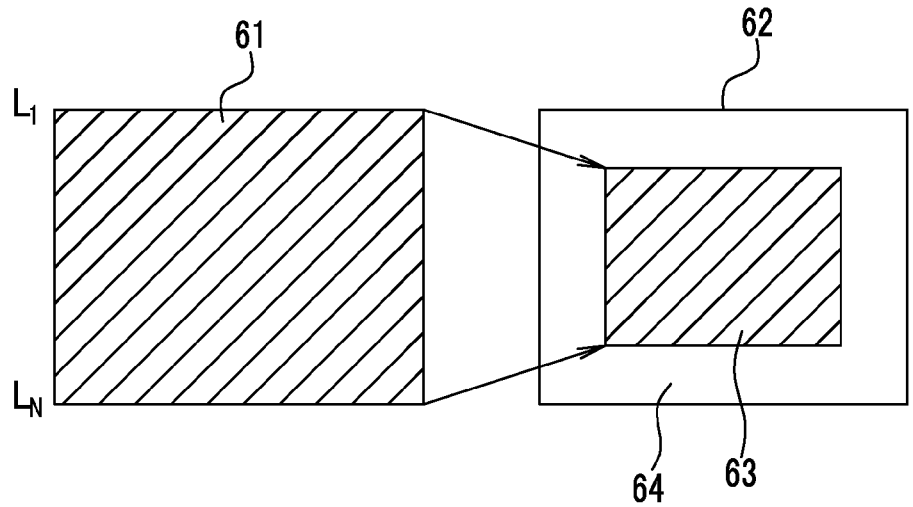
FIG. 5 is an explanatory diagram of reduced image display.

In the imaging device 10 configured as described above, the size (display size) of the live view image displayed on the first display section 17 can be substantially arbitrarily set, display setting is roughly classified into two types of display setting of full screen display and display setting of reduced image display, and one of the settings can be selected. As shown in FIG. 4, in the full screen display, a live view image 61, which is generated using the imaging signals acquired from lines $L_1$ to $L_N$ including an effective pixel region of an image sensor 13, is displayed at the same size as that of the display screen 62 of the first display section 17. Further, as shown in FIG. 5, in the reduced image display, a reduction region 63 is set at the center of the display screen 62, the live view image 61 is displayed on the reduction region 63, and a peripheral region 64 other than the reduction region 63 is set as a blank region (displayed in black).

Figure 6:
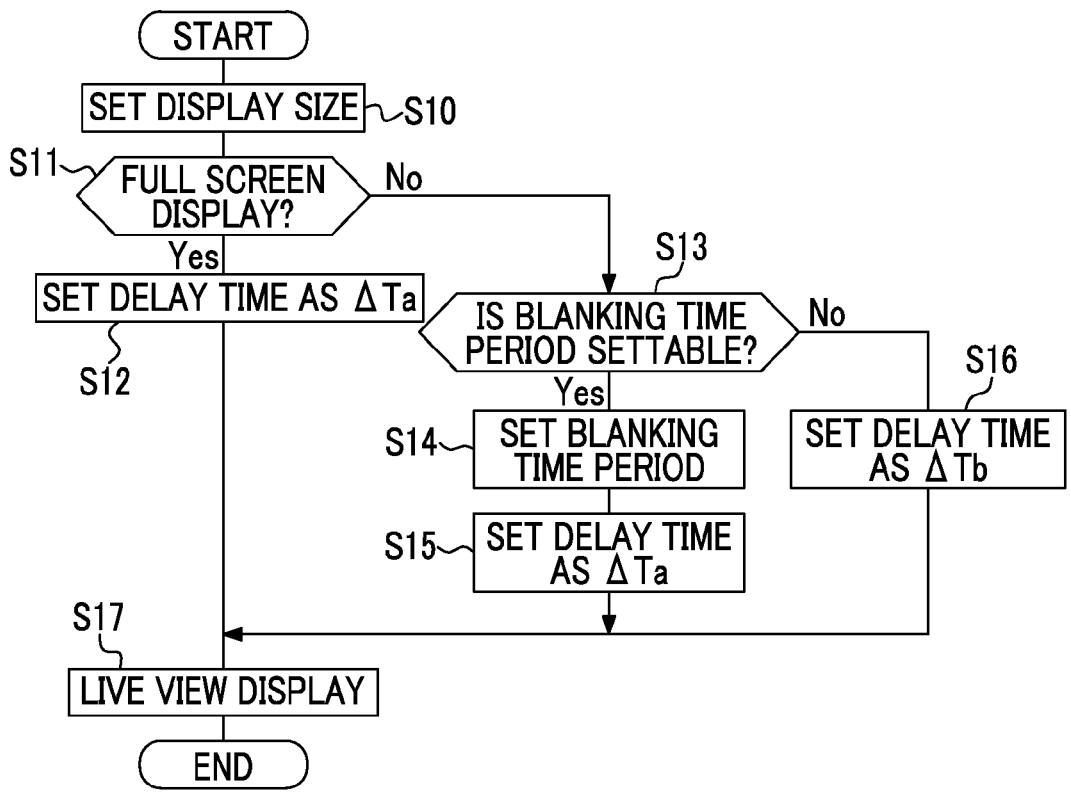
FIG. 6 is a flowchart illustrating operations of the imaging device.

As shown in FIG. 6, the display size of the live view image is set by displaying a setting menu through the second display section 18 and selecting the full screen display or the reduced image display through the operation section 23, before photography or in the course of photography (S10). If the reduced image display is selected, by further setting the viewing angle (reduction percentage), the size of the reduction region 63 is set.

If the full screen display is selected (Yes is determined in S11), the display timing control section 52 sets a delay time of a display timing signal from a driving timing signal as $\Delta$Ta (S12), and performs live view display (S16).

In contrast, if the reduced image display is selected (No is determined in S11), the blanking time period setting section 53 calculates the length of the blanking time period $T_{BL}$ in accordance with the set viewing angle (reduction percentage).

Then, it is determined whether or not the image sensor 13 is able to perform the reading operation appropriate for the calculated blanking time period $T_{BL}$ (S13).

If the image sensor 13 is able to perform the reading operation appropriate for the blanking time period $T_{BL}$ (Yes is determined in S13), in the time period ($T_{F1}-T_{BL}$) which is obtained by subtracting the blanking time period $T_{BL}$ from the single frame period $T_{F1}$, a parameter for designating a reading method of completely reading the imaging signals for each screen is input to the sensor driver 33, whereby the blanking time period $T_{BL}$ is set in the single frame period $T_{F1}$ (S14).

The display timing control section 52 is notified of a result of determination as to whether or not the image sensor 13 is able to perform the reading operation appropriate for the calculated blanking time period $T_{BL}$. At this time, if the image sensor 13 is able to perform the reading operation appropriate for the blanking time period $T_{BL}$, the display timing control section 52 sets the delay time of the display timing signal from the driving timing signal as $\Delta$Ta (S15). Thereby, the imaging device 10 reduces the size of the live view image and displays the image in a state where the shortest delay time $\Delta$Ta the same as that in the case of the full screen display is maintained (S17).

In contrast, due to specification of the image sensor 13 and the like, the image sensor 13 may be unable to perform the reading operation appropriate for the blanking time period $T_{BL}$ (No is determined in S13). In this case, the blanking time period setting section 53 does not set the blanking time period $T_{BL}$, and the display timing control section 52 sets the delay time of the display timing signal from the driving timing signal as $\Delta$Tb (S16). Thereby, although the delay time increases as compared with the full screen display, the imaging device 10 secures the delay time $\Delta$Tb for normally storing the displayed image in the VRAM 36a through the display image generation section 39 and normally reading the displayed image from the VRAM 36a through the first display section 17, and normally reduces the size of the live view image and displays the image (S17).

Hereinafter, a description will be given of timing of operations of the image sensor 13 and the first display section 17 in the following cases: a case where the live view image is displayed in a full screen mode; a case where the blanking time period $T_{BL}$ is set and the live view image is reduced and displayed; and a case where the blanking time period $T_{BL}$ is not set and the live view image is reduced and displayed.

Figure 7:
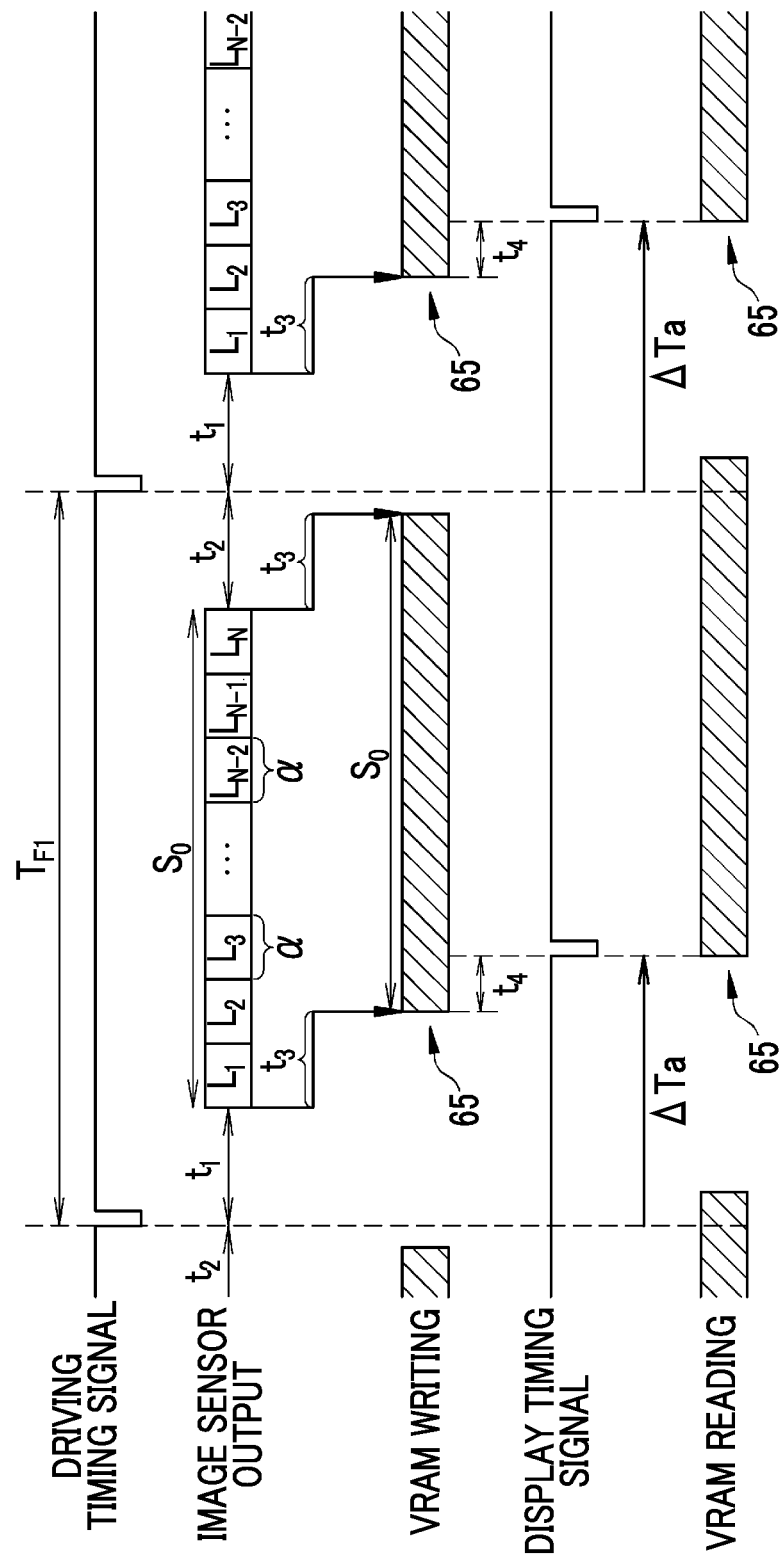
FIG. 7 is a timing chart in a case of performing full screen display.

As shown in FIG. 7, if the live view image is displayed in a full screen mode, the driving timing control section 51 inputs the driving timing signal, which starts performing the reading operation with a certain time interval (single frame period $T_{F1}$), to the sensor driver 33. The sensor driver 33 sequentially outputs the imaging signals from the respective lines of the image sensor 13 in response to the driving timing signal. However, a part of the image capture surface 13a of the image sensor 13 is not used in image capturing of a subject. Therefore, in order to delete the imaging signals of the unused part, a certain time period $t_1$ is necessary until the imaging signal is output from the first line $L_1$ including the effective pixel region for capturing an image of the subject. Likewise, after reading of the last line $L_N$ including the effective pixel region is completed, a time period $t_2$ to the next single frame period $T_{F1}$ is a time period which is necessary for the deletion of the imaging signals of the lines which do not include the effective pixel region.

Accordingly, reading of each imaging signal from the lines $L_1$ to $L_N$ including the effective pixel region is performed in a time period $S_0$ ($=T_{F1}-t_1-t_2$) which is obtained by subtracting the time periods $t_1$ and $t_2$ from the single frame period $T_{F1}$. In addition, when reading the imaging signal, each pixel of the image sensor removes (resets) an accumulated electric charge, and immediately starts an accumulation operation for the next single frame period $T_{F1}$.

A time period $t_3$ is necessary for a time from reading of the imaging signal of each of the lines $L_1$ to $L_N$ to writing of data of each line of the display image 65 into the VRAM 36a. The time period $t_3$ is the shortest time period which is necessary for the signal processing section 34 to sequentially generate data of each line of the live view image 61 from the imaging signal of each of the lines $L_1$ to $L_N$ and temporarily store the data in the RAM 36 and for the display image generation section 39 to generate the display image 65 by using the data of each line of the live view image 61 and write the image into the VRAM 36a. That is, the timing of starting writing the display image 65 into the VRAM 36a is delayed with only the time period $t_3$ from the start of reading of the imaging signal of the line $L_1$, and the timing of completely writing the display image 65 into the VRAM 36a is delayed with only the time period $t_3$ from completion of the reading of the imaging signal of the line $L_N$.

When the first display section 17 displays the live view image 61 in a full screen mode, the lines of the live view image 61 respectively correspond to the lines of the display image 65 (display screen 62). Therefore, the time period of writing the display image 65 into VRAM 36a is $S_0$, and is the same as the time period $S_0$ which is necessary for reading the imaging signals of the lines $L_1$ to $L_N$ of the image sensor 13. If a time period necessary for the image sensor 13 to read the imaging signal of the single line is $\alpha$, "$S_0 = \alpha \times N$".

The writing of the display image 65 into the VRAM 36a through the display image generation section 39 and the reading of the display image 65 from the VRAM 36a through the first display section 17 are performed substantially concurrently (for example performed alternately on every line of the display image 65). However, it is apparent that access to the read data has to be performed after the data is written into the VRAM 36a. Hence, it is necessary to provide a time lag of a time period $t_4$ between writing and reading of the display image 65 into and from the VRAM 36a. This time period $t_4$ is, for example, a time period which is necessary for writing data, which corresponds to a single line of the display image 65, into the VRAM 36a.

Therefore, as the shortest delay time from the input of the driving timing signal to a time point at which the first display section 17 reads the data of the display image 65 from the VRAM 36a and displays the image, at least a total $\Delta Ta$ ($= t_1 + t_3 + t_4$) of the time periods $t_1$, $t_3$, and $t_4$ is necessary. Hence, the display timing control section 52 generates the display timing signal which is synchronized with the driving timing signal with a delay of the shortest delay time $\Delta Ta$.

As described above, when the first display section 17 displays the live view image 61 in a full screen mode, the imaging device 10 operates the first display section 17 in response to the display timing signal which is synchronized with the driving timing signal with a delay time $\Delta Ta$. Therefore, it is possible to display the live view image substantially in real time (with a delay time shorter than the single frame period $T_{F1}$). For example, as compared with the case where the first display section 17 reads the display image 65 after writing of the data of all the lines of the display image 65 into the VRAM 36a is completed, it is possible to promptly display a live view image.

Figure 8:
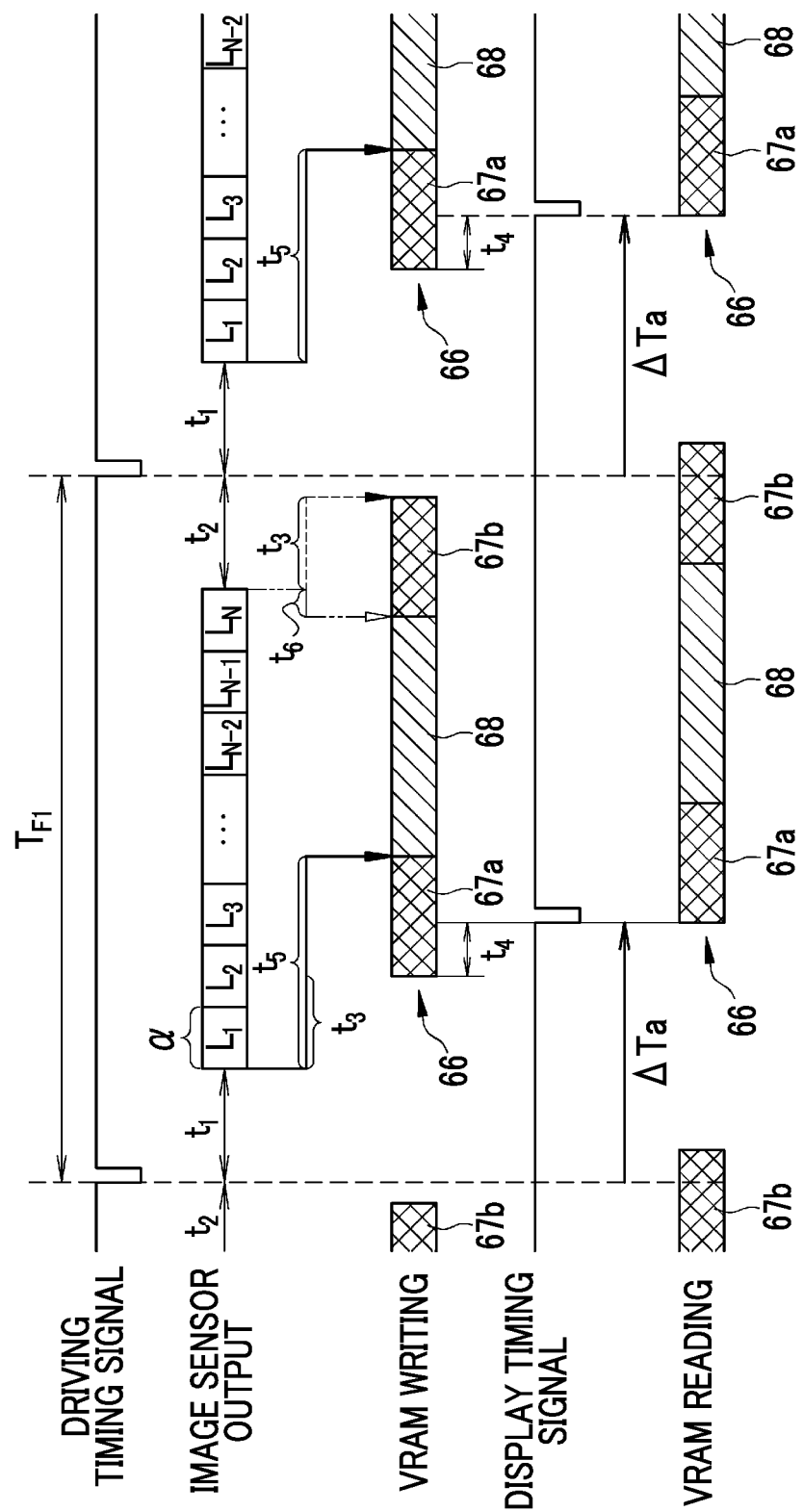
FIG. 8 is a timing chart in a case of performing reduced image display without a blanking time period.

In contrast, as shown in FIG. 8, when the live view image is reduced and displayed, in the display image 66, a predetermined number of lines at the head and the tail are blank data 67a and 67b, and data present therebetween is data 68 of lines including the reduction region 63 to which the live view image 61 is applied. The data 68 is stored in units of lines. Therefore, both ends of the data of each line also include blank data. Hereinafter, for the sake of simplicity, the data 68 of lines including the reduction region 63, to which the live view image 61 is applied, is referred to as a reduced live view image 68.

Hereinafter, the following case is considered: the delay time of the display timing signal relative to the driving timing signal is maintained at the delay time $\Delta Ta$ which is the same as that in the case of the full screen display. In this case, data of the first line $L_1$ including the effective pixel region of the image sensor 13 is necessary for generation of data (data at the left end of the band (hatched) indicating the reduced live view image 68) of the head line of the reduced live view image 68. However, there is a time period of writing the blank data 67a into VRAM 36a. Thus, it is possible to secure a time period $t_5$ which is the time taken until the data of the head line is written into the VRAM 36a and which is longer than the time period $t_3$.

In contrast, data of the last line $L_N$ including the effective pixel region of the image sensor 13 is necessary for generation of data (data at the right end of the band (hatched) indicating the reduced live view image 68) of the tail line of the reduced live view image 68. However, a time period of writing the data of the tail line into VRAM 36a is longer than that in the case of the full screen display. Thus, it is difficult to secure the time period $t_3$ which is necessary for signal processing for generating the live view image 61 and the like. In particular, in accordance with the viewing angle (reduction percentage) of the live view image 61, the data of the tail line of the reduced live view image 68 has to be written into the VRAM 36a before (at the time previous by the time period $t_6$ to) completion of the reading of the imaging signal of the line $L_N$ of the image sensor 13. However, as might be expected, such an operation is not possible.

Figure 9:
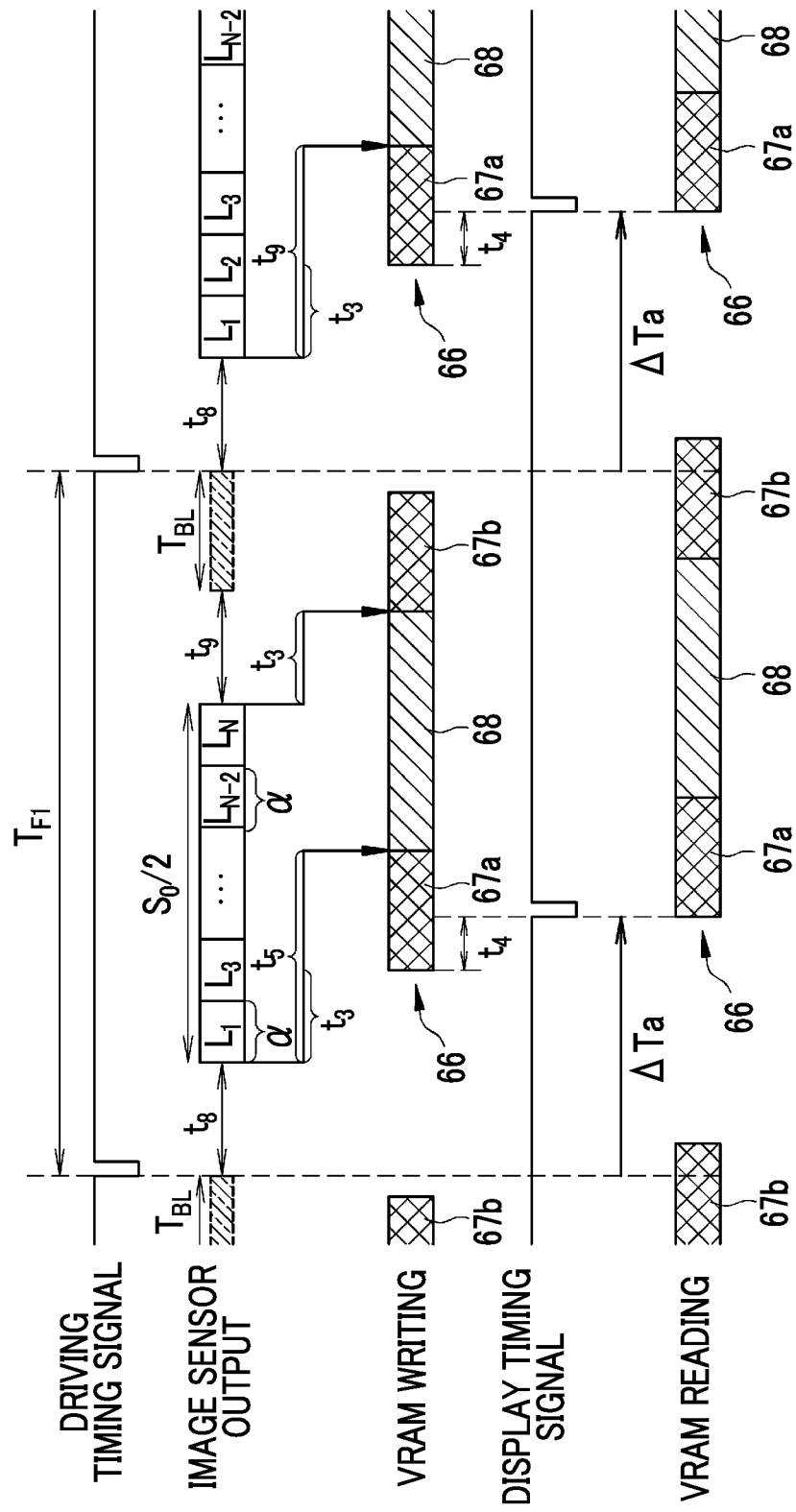
FIG. 9 is a timing chart in a case of providing a blanking time period through thinning-out reading and performing reduced image display.

Accordingly, as shown in FIG. 9, if the live view image 61 is reduced and displayed, the imaging device 10 sets the blanking time period $T_{BL}$ in which the blanking time period setting section 53 does not read the imaging signal at the end of the single frame period $T_{F1}$. Then, reading of the imaging signals for each screen is completed in the time period $(T_{F1} - T_{BL})$ which is obtained by subtracting the blanking time period $T_{1m}$ from the single frame period $T_{F1}$. Thereby, the time period $t_3$ is secured. The time period $t_3$ ranges from completion of reading of the imaging signal of the line $L_N$ of the image sensor 13 to writing of the data of the tail line of the reduced live view image 68 into the VRAM 36a. Thereby, it is possible to reduce the size of the live view image 61 and display the image while maintaining the delay time of the display timing signal relative to the driving timing signal at the delay time $\Delta Ta$ which is the same as that in the case of the full screen display (refer to FIG. 7).

In the case of FIG. 9, the blanking time period setting section 53 inputs a parameter, which is for thinning-out reading which reads every other line ($L_1, L_3, \ldots, L_{N-2}$, and $L_N$), to the sensor driver 33, and reduces the number of lines to be subjected to reading of the imaging signals sent from the image sensor 13, thereby setting the blanking time period $T_{BL}$. Hence, a total of the reading time periods of the lines $L_1, L_3, \ldots, L_{N-2}$ and $L_N$, which include the effective pixels, is a half ($S_0/2$) of that in the case of the full screen display. Further, each of the time periods $t_8$ and $t_9$, which are for deleting the imaging signals of lines not including the effective pixel region by changing the reading method, is also half ($t_8 = t_1/2$ or $t_9 = t_2/2$) of that in the case of the full screen display. As might be expected, the blanking time period setting section 53 calculates the length of the blanking time period $T_{BL}$ in consideration of changes in lengths of time periods. Further, in the example shown in FIG. 9, the blanking time period $T_{BL}$ is set by performing thinning-out reading on every other line. However, the number of lines to be subjected to the thinning-out reading is determined depending on the blanking time period $T_{HL}$.

In accordance with specification of the image sensor 13 and the like, an operation corresponding to the blanking time period $T_{BL}$ calculated by the blanking time period setting section 53 may be not possible. For example, the image sensor 13 may be not compliant with thinning-out reading. Further, in order to set the blanking time period $T_{BL}$, it may be necessary to perform thinning-out reading on every third line. In this case, the image sensor 13 may be compliant with only thinning-out reading for every other line (may be unable to perform thinning-out reading on every third line). Furthermore, in order to set the blanking time period $T_{BL}$, it may be necessary to perform thinning-out reading on lines which are separated from each other by intervals of 1.5 lines. In this case, a general image sensor 13 is unable to be compliant with thinning-out reading for such an uncertain number of lines.

Figure 10:
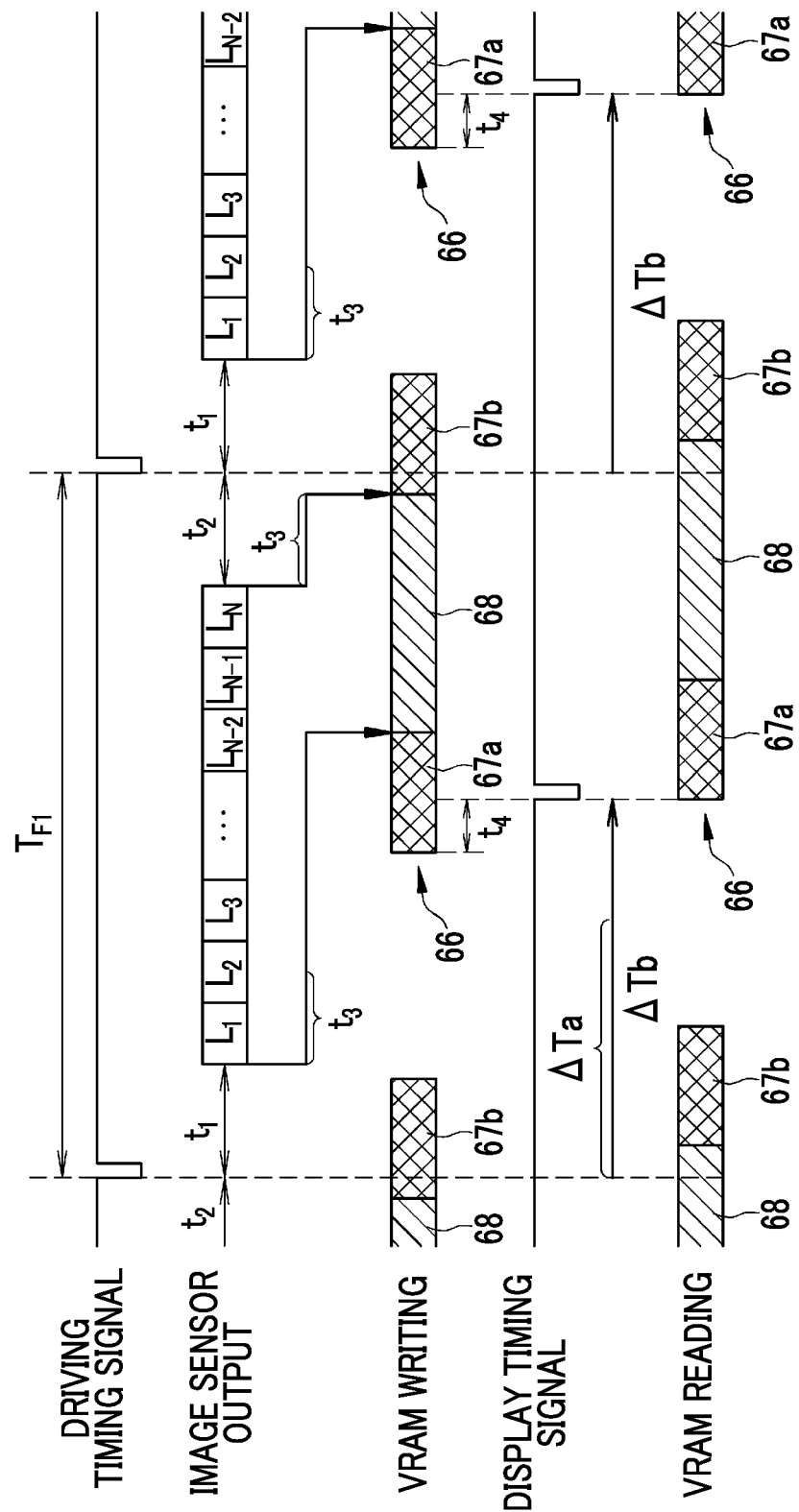
FIG. 10 is a timing chart in a case of increasing a display delay and performing reduced image display.

If the blanking time period $T_{BL}$ cannot be set as described above, as shown in FIG. 10, instead of setting the blanking time period $T_{BL}$, the display timing control section 52 extends the delay time of the display timing signal relative to the driving timing signal by $\Delta Tb$, and shifts back overall the timing of reading the display image 66 from the VRAM 36a. Thereby, the timing of writing the display image 66 into the VRAM 36a is shifted back. Therefore, the time period $t_3$, which ranges from completion of the reading of the imaging signal of the line $L_N$ of the image sensor 13 to writing the data of the tail line of the reduced live view image 68 into the VRAM 36a, is secured. An amount ($\Delta Tb-\Delta Ta$) of extension of the delay time $\Delta Tb$ relative to the delay time $\Delta Ta$ is up to about $S_0/2$, and is therefore shorter than at least the single frame period $T_{F1}$. Consequently, although the delay time $\Delta Ta$ the same as that in the case of the full screen display cannot be maintained, it is possible to perform the live view display, which is closest to real time display, when reducing the size of the live view image and displaying the image without setting the blanking time period $T_{BL}$.

Figure 11:
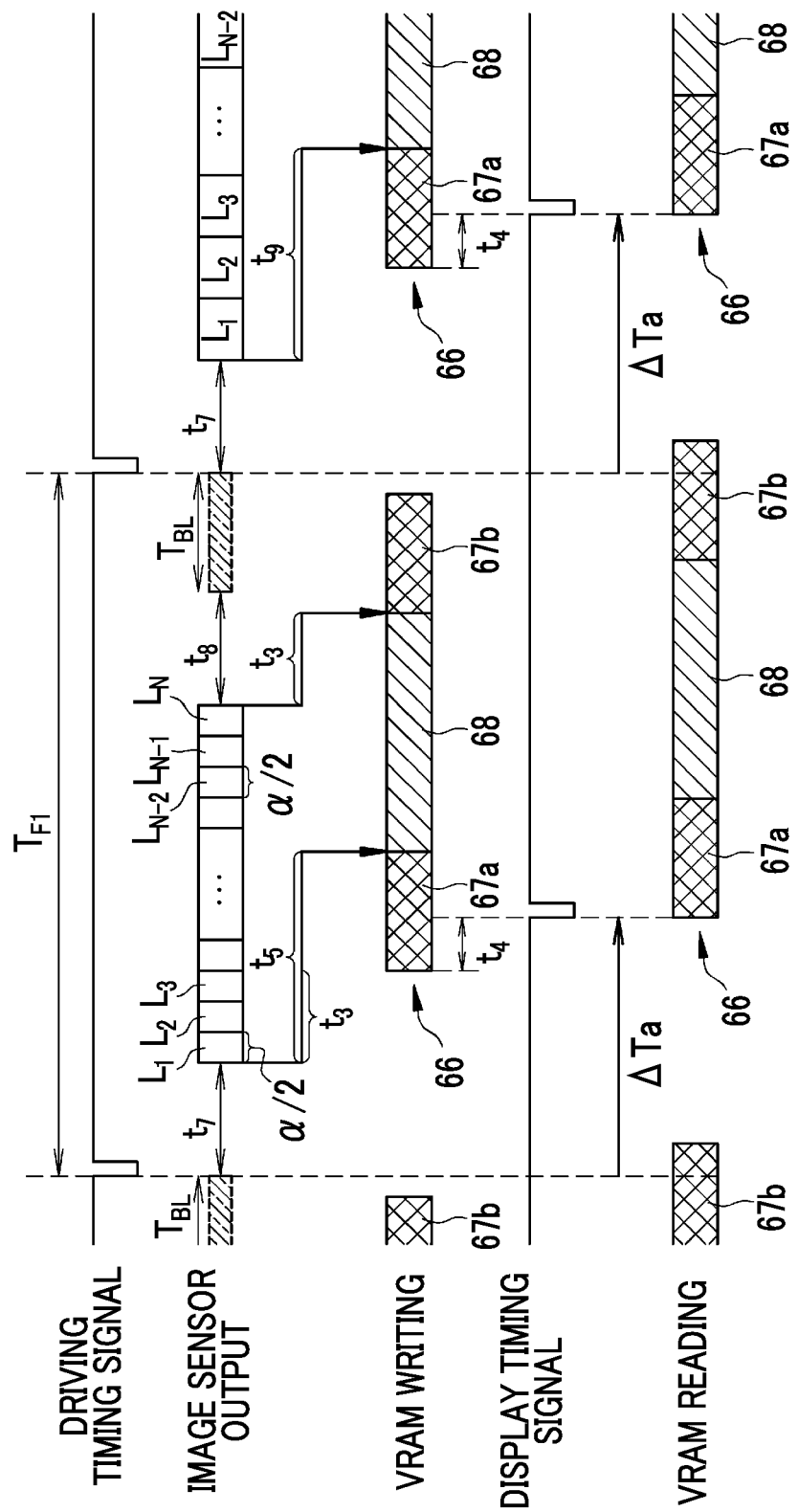
FIG. 11 is a timing chart in a case of providing a blanking time period through pixel mixture reading and performing reduced image display.

The blanking time period setting section 53 sets the blanking time period $T_{BL}$ by performing thinning-out reading on the image sensor 13. However, as shown in FIG. 11, by reducing the time period (for example, $\alpha/2$) of reading the imaging signal from each line of the image sensor 13, the blanking time period $T_{BL}$ may be set. Examples of the method of reducing the time period of reading the imaging signal from each line of the image sensor 13 include: a method of performing pixel mixture reading which mixes a plurality of pixel signals at the same line and simultaneously reads the pixels; a method of increasing an operation clock of a circuit for reading such as a switching element or an A/D converter constituting the image sensor 13; a method of reducing a data bit length of the imaging signal to be read.

In the pixel mixture reading, for example, if two pixel signals are mixed and the imaging signal thereof is read, reading of the imaging signal can be completed in a time period which is half of that in the case of reading all the pixels. The operation clock defines a reading speed. Therefore, by increasing the operation clock, an increase in speed of the reading of the imaging signal can be achieved. If the data bit length of the imaging signal is shortened by for example 2 bits, an amount of the data becomes ¼ times the original amount. Thereby, it is possible to improve the speed of the reading of the imaging signal.

Figure 12:
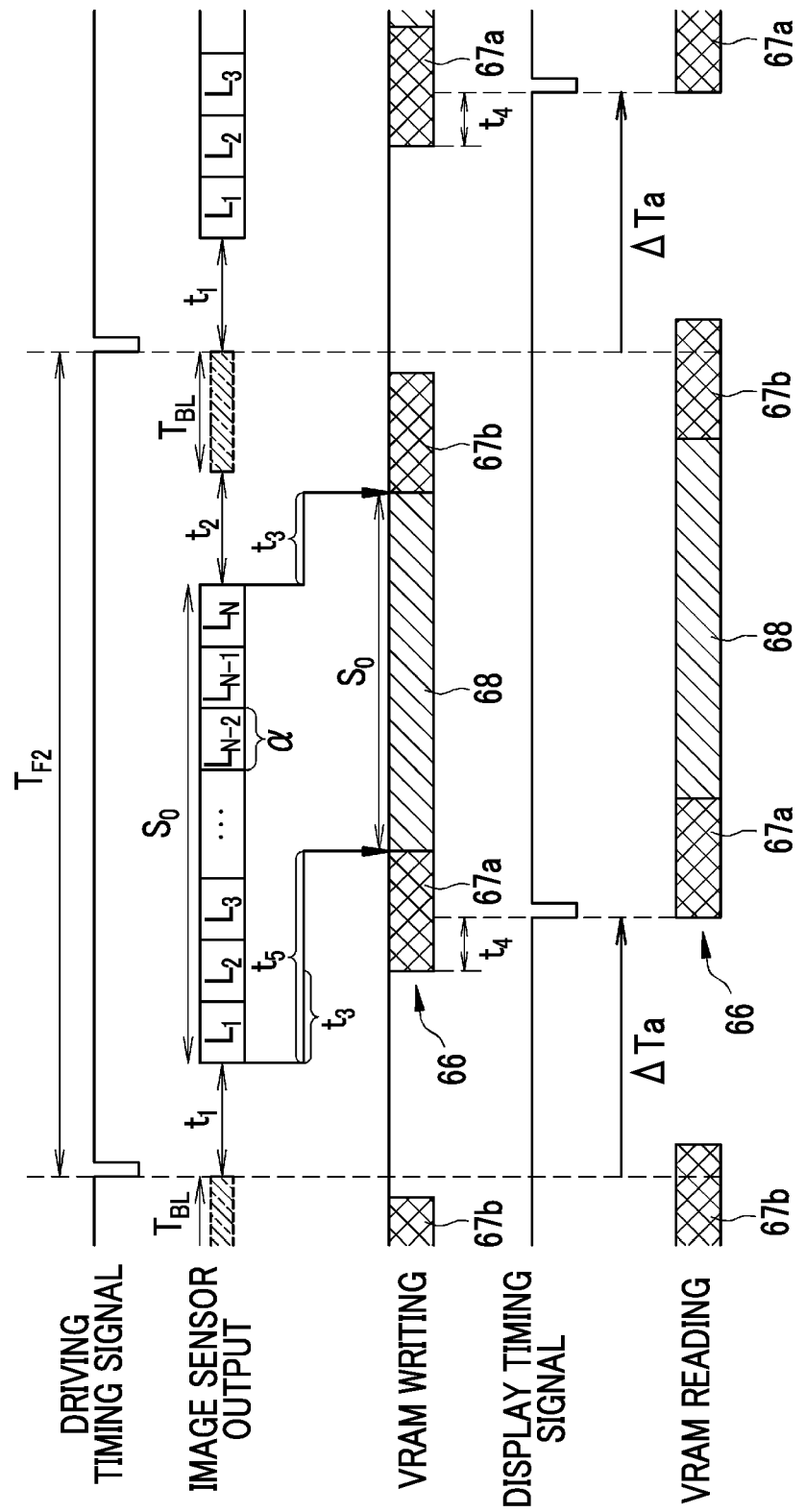
FIG. 12 is a timing chart in a case of providing a blanking time period by extending a single frame period and performing reduced image display.

The blanking time period setting section 53 sets the blanking time period $T_{BL}$ by changing an operation method (reading method) of the image sensor 13, but may set the blanking time period $T_{BL}$ in the method. For example, as shown in FIG. 12, the length of the single frame period extends to $T_{F2}$ ($>T_{F1}$), and a time period of writing apart of the reduced live view image 68 of the display image 66 into the VRAM 36a extends to $S_0$ which is the same as that in the case of the full screen display. Thereby, even when the operation method of the image sensor 13 is not changed, by securing the time period $t_3$ from completion of the reading of the imaging signal of the line $L_N$ to writing of data of the tail line of the reduced live view image 68 into the VRAM 36a, it is possible to perform the reduced image display while maintaining the delay time of the display timing signal relative to the driving timing signal at the delay time $\Delta Ta$ which is the same as that in the case of the full screen display.

Figure 13:
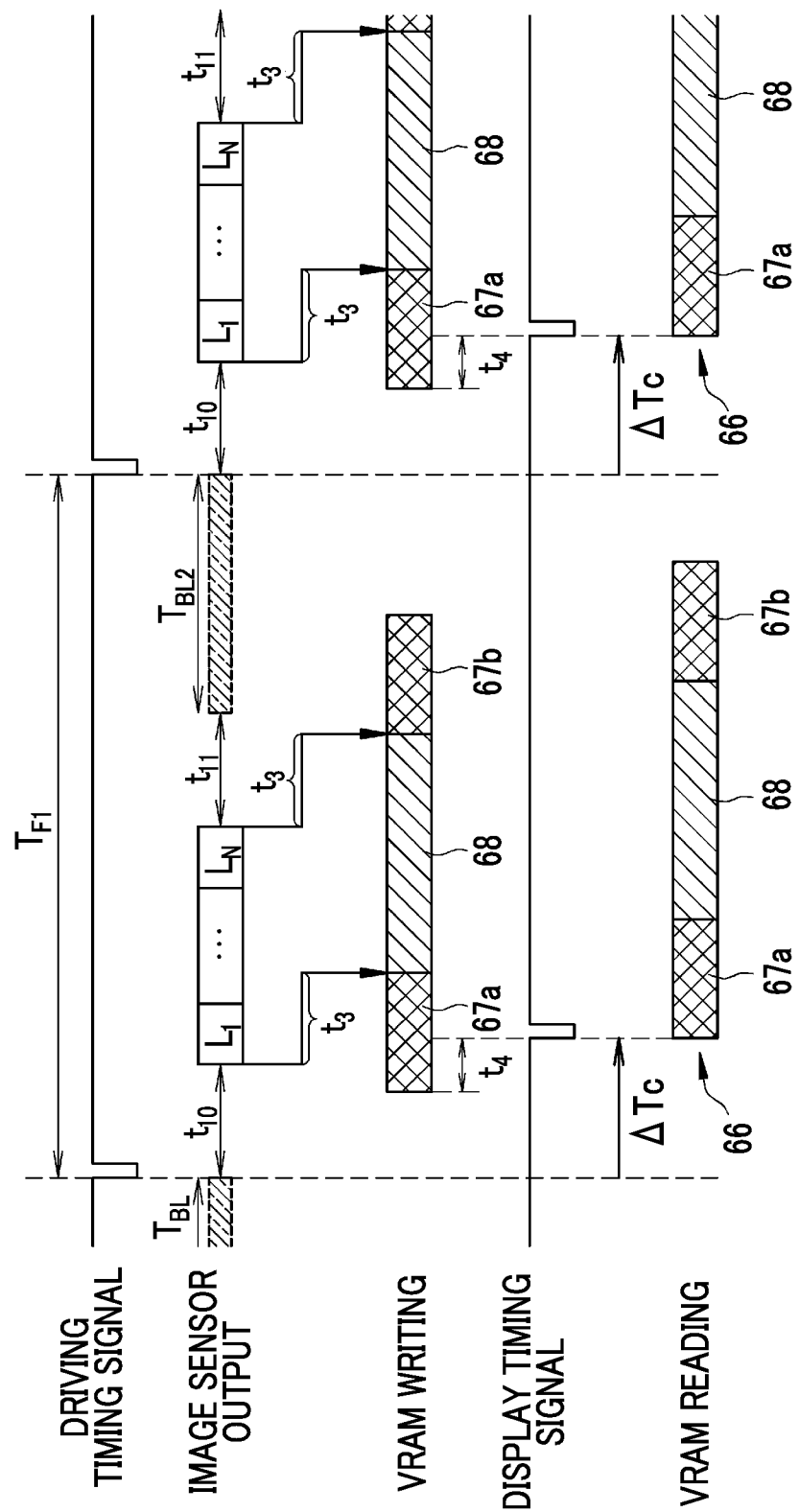
FIG. 13 is a timing chart in a case of reducing a delay time.

The blanking time period setting section 53 sets the blanking time period $T_{BL}$ so as to secure the time period $t_3$ from completion of the reading of the imaging signal of the line $L_N$ of the image sensor 13 to writing of data of the tail line of the reduced live view image 68 into the VRAM 36a. However, the blank data 67a is predetermined data, and thus the writing into the VRAM 36a is performed before the imaging signals are read from the image sensor 13. Specifically, as shown in FIG. 13, the writing of the blank data 67a into the VRAM 36a is started before the reading of the imaging signals from the image sensor 13, and the blanking time period $T_{BL2}$ can be set such the time period $t_3$ is constituted of both time periods: a time period from start of reading of the line $L_1$ of the image sensor 13 to start of writing of data of the head line of the reduced live view image 86 into the VRAM 36a; and a time period from completion of reading of the imaging signal of the line $L_N$ of the image sensor 13 to writing of data of the tail line of the reduced live view image 68 into the VRAM 36a.

In this case, the delay time of the display timing signal relative to the driving timing signal can be set as a delay time $\Delta Tc$ which is shorter than the delay time $\Delta Ta$ in the case of the full screen display. In accordance with the viewing angle (reduction percentage) of the live view image 61 and the length (the number of lines) of the blank data 67a, the delay time $\Delta Tc$ may be "0" or a negative value. As a result, an actual display delay of the live view image may become extremely short. In addition, the time periods $t_{1c}$ and $t_{1l}$ are time periods necessary for deleting the imaging signals of the lines which do not include the effective pixel region.

In the above-mentioned method (FIG. 13), the blanking time period $T_{BL2}$ is set such that the time period $t_3$ is a time period from the start of the reading of the line $L_1$ of the image sensor 13 to the start of the writing of data of the head line of the reduced live view image 86 into the VRAM 36a. The method is more effectively used in combination with the method (refer to FIG. 12) of extending the single frame period. The reason for this is that, for example, the delay time may be shortened while a decrease in frame rate is suppressed by maintaining the number of lines (resolution of the live view image) to be subjected to reading of the imaging signals from the image sensor 13.

If the blanking time period $T_{BL}$ is set in order to reduce the size of the live view image and display the image, the above-mentioned methods of thinning-out reading, pixel mixing, changing the operation clock, changing the data bit length of the imaging signal, and changing the single frame period (frame rate) can be used in combination. Among those, the changing of the single frame period and the thinning-out reading (or the pixel mixing, the changing the data bit length of the imaging signal) accompanied with a decrease in resolution of the live view image 61 may be combined. If the blanking time period $T_{BL}$ is set with this combination, it is preferable that, in accordance with a photography mode, combination balance is adjusted such that either one of the single frame period or the resolution of the live view image 61 is preferentially maintained.

For example, the thinning-out reading and the extending of the single frame period may be combined. In this case, the number of lines, which will be subjected to reading of the imaging signals in order generate the live view image 61, is changeable in three stages of $P_1$, $P_2$, and $P3$ ($P_1>P_2>P_3$). Further, the single frame period is changeable in three stages of $T_{F1}$, $T_{F2}$, and $T_{F3}$ ($T_{F1}<T_{F2}<T_{F3}$) that is, the frame rate can be changed to $1/T_{F1}$, $1/T_{F2}$, or $1/T_{F3}$. The imaging device 10 has: a first photography mode (for example, a sports mode) that gives priority to a shutter speed selected when photographing a moving subject; and a second photography mode that is selected when photographing a subject, such as a person or a landscape, which scarcely moves.

Figure 14:
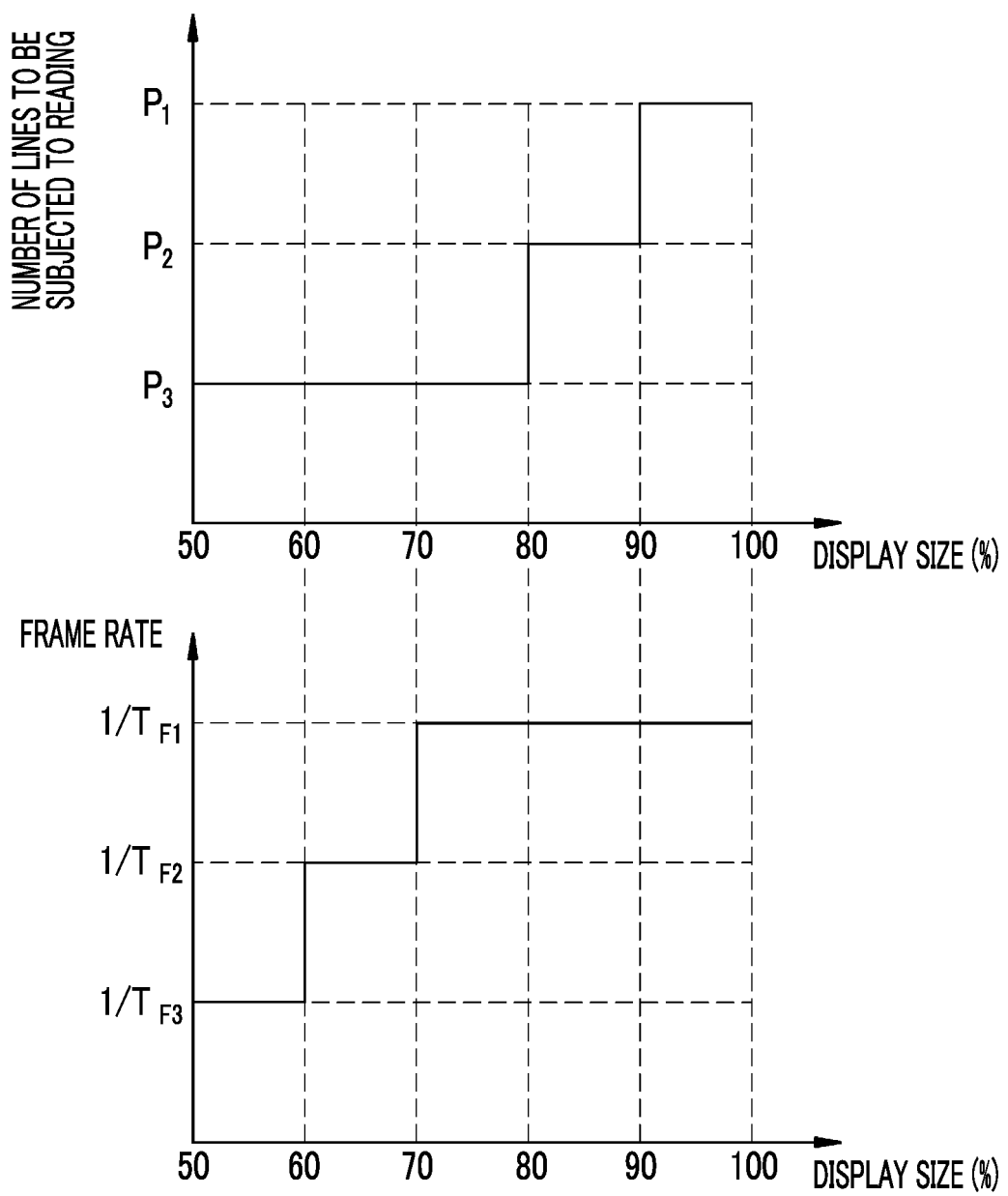
FIG. 14 is an explanatory diagram illustrating optimal combination of the number of reading pixels and a frame rate.
Figure 15:
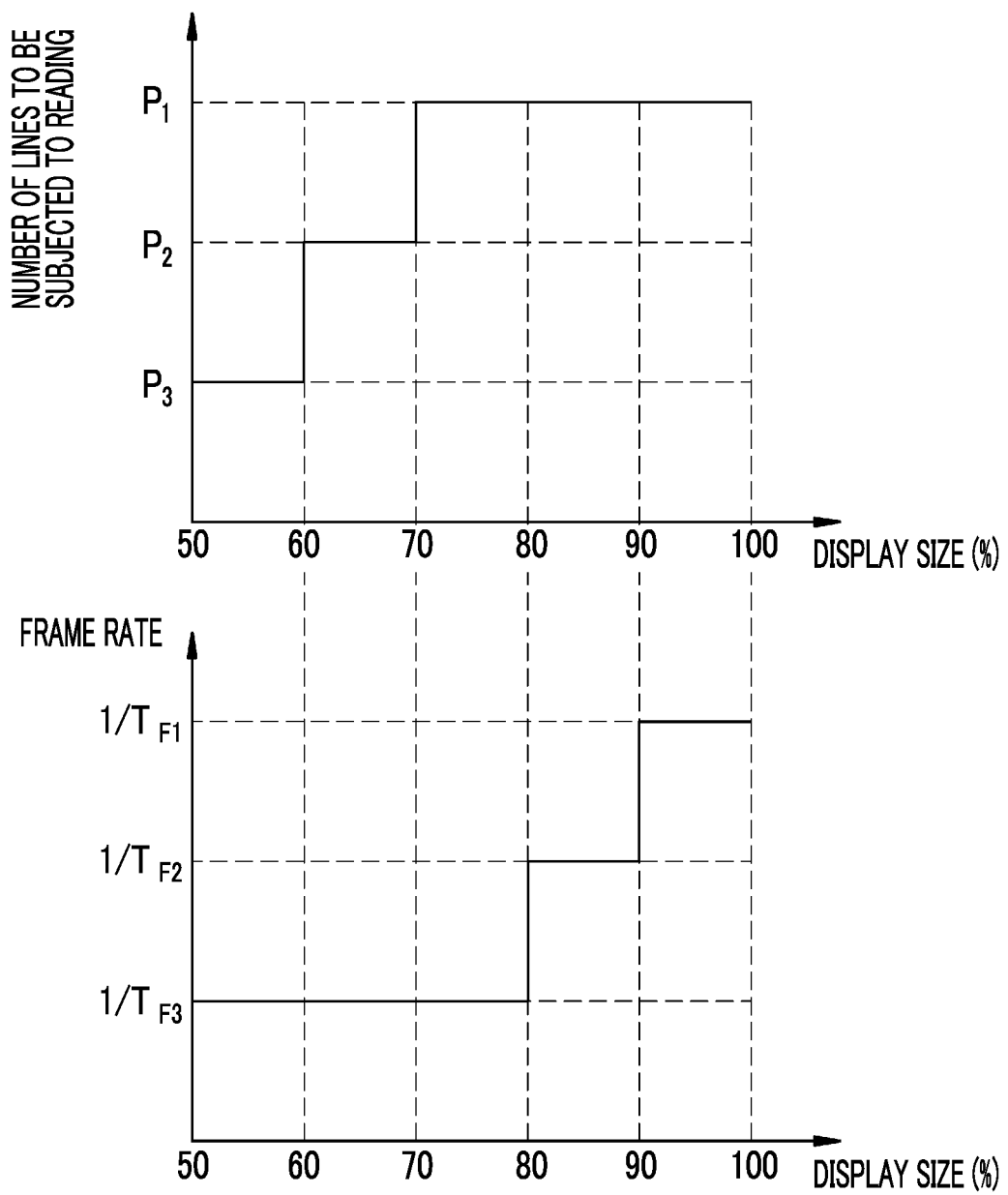
FIG. 15 is an explanatory diagram illustrating optimal combination of the number of reading pixels and the frame rate.

For example, in the first photography mode, as shown in FIG. 14, the blanking time period $T_{BL}$ is set by preferentially decreasing the number of lines subjected to reading while maintaining the frame rate, relative to a decrease in display size (size of the reduction region 63) of the live view image 61. In the second photography mode, as shown in FIG. 15, the blanking time period $T_{BL}$ is set by preferentially decreasing the frame rate while maintaining the number of lines subjected to reading for as long as possible, relative to the decrease in display size of the live view image 61.

In such a manner, the changing of the single frame period and the thinning-out reading (or the pixel mixing, the changing the data bit length of the imaging signal) accompanied with a decrease in resolution of the live view image 61 may be combined. If the blanking time period $T_{BL}$ is set with this combination, it is preferable that setting for a photography mode is provided for each photography mode in advance and is automatically applied by selecting the photography mode.

Figure 16:
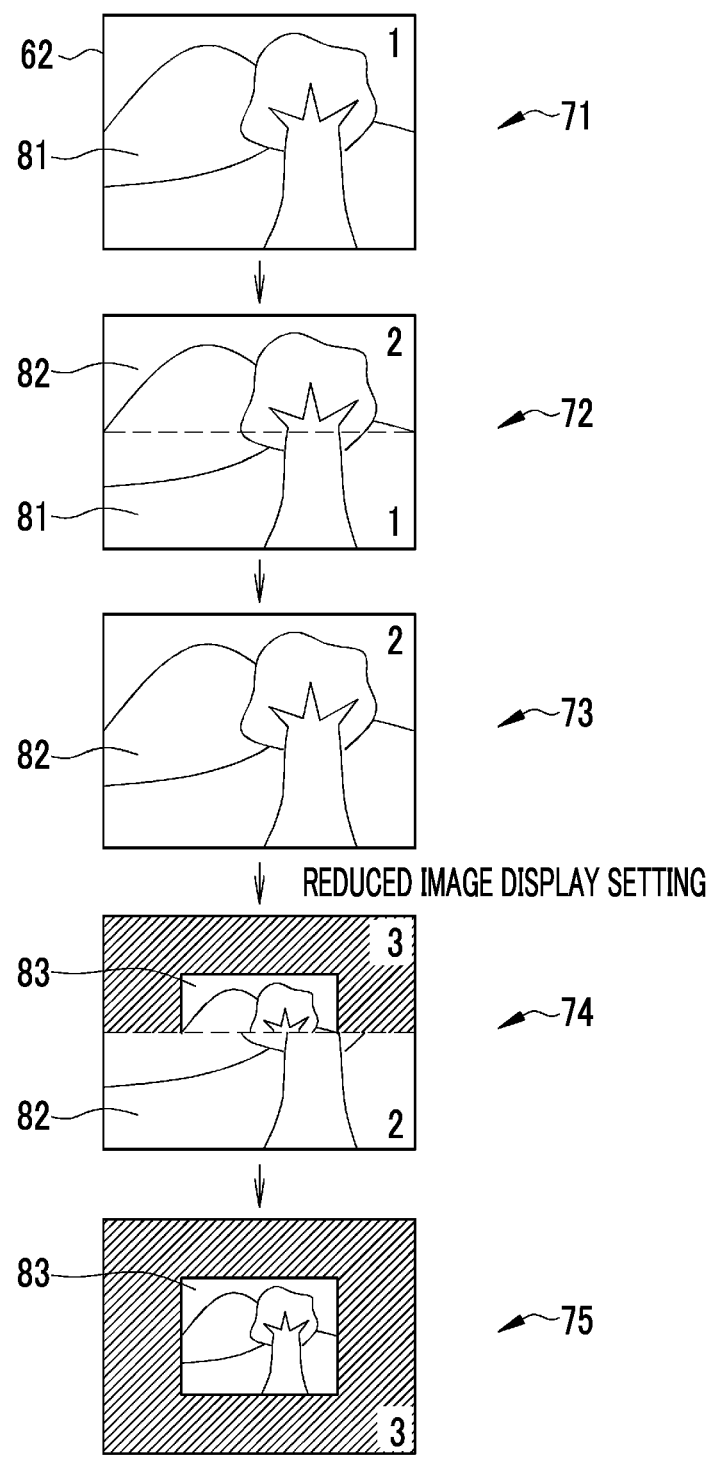
FIG. 16 is an explanatory diagram illustrating changes of the display screen in a case of changing (reducing) the display size.

When the live view image 61 is displayed in a full screen mode, if the current display is switched to the reduced image display, live view images having different sizes are displayed on the display screen 62 in a state where the images are mixed, in the course of the switching. Specifically, as shown in FIG. 16, it is assumed that a first live view image 81 is displayed on the display screen 62 in a full screen mode at a first frame 71. In this case, if the current setting is not switched to reduced image display setting, for example, a second live view image 82 is displayed to be overwritten in an order starting from the top of the display screen 62 as indicated by a transient frame 72, and a second live view image 83 is displayed on the display screen 62 in a full screen mode at a second frame 73. At the transient frame 72, the first live view image 81 and the second live view image 82 are displayed on the upper and lower sides in a state where the images are mixed. However, the first live view image 81 and the second live view image 82 are images which are photographed at continuous frames, and thus there is negligible change, and the display sizes are also the same. As a result, a general user does not notice that the live view images 81 and 82 are mixed.

At this time, if the current setting is switched to the reduced image display setting, at a third frame 75, a third live view image 83 is reduced and displayed at the center. However, at a transient frame 74 between the second frame 73 and the third frame 75, the reduced third live view image 83 and the second live view image 82 having the same size as the display screen 62 are mixed. As shown in the transient frame 74, a time period, in which images having different sizes are mixed through switching to the reduced image display, is shorter than the single frame period $T_{F1}$, and the images are temporarily present. However, if the images having different sizes are mixed, even a general user may still perceive the image as being unnatural. Hence, if the current setting is switched to the reduced image display setting, it is preferable that the current display is not immediately switched to the reduced image display, but switched to the reduced image display after switching to the reduced image display is visually notified using about one to several frames, thereby reducing the unnatural perception of the transient frame at which the images having different sizes are mixed.

Figure 17:
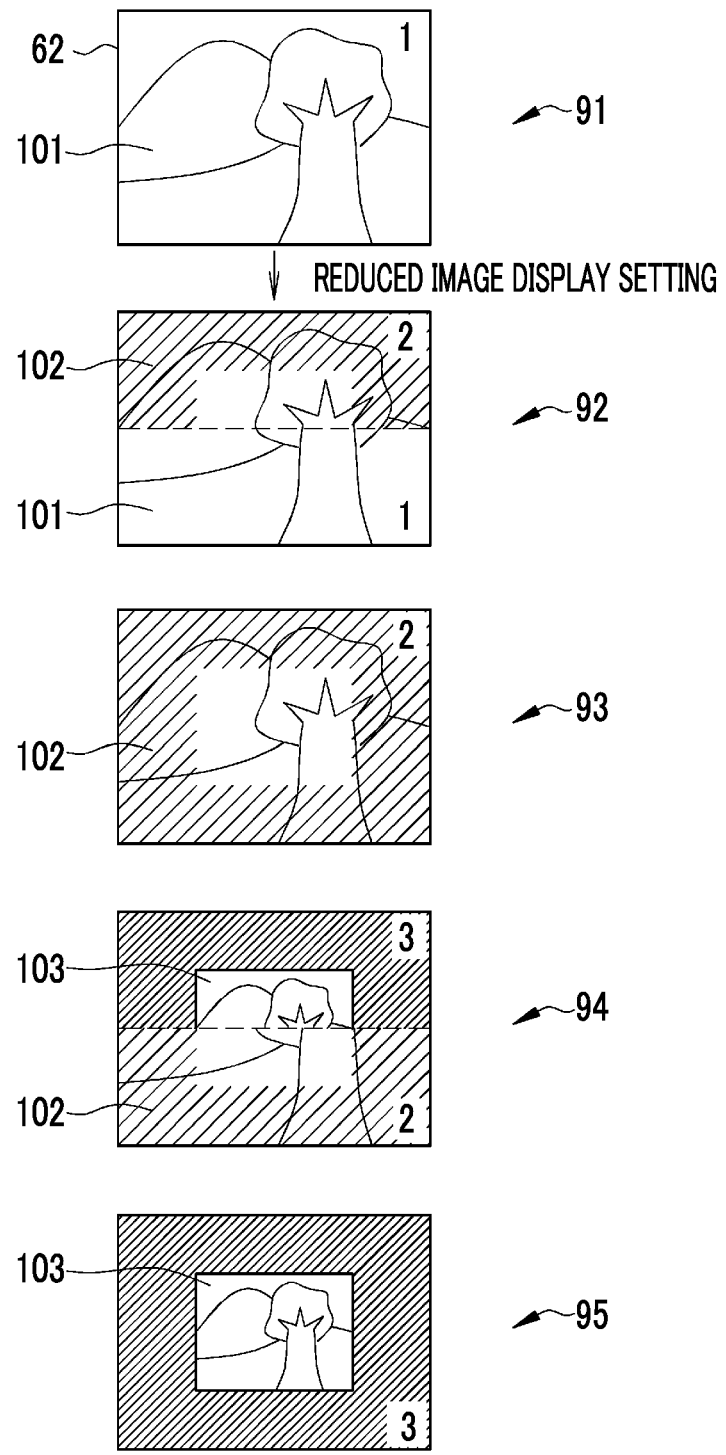
FIG. 17 is an explanatory diagram illustrating changes of the display screen in a case of changing (reducing) the display size.

Specifically, as shown in FIG. 17, at a first frame 91, a first live view image 101 is displayed on the display screen 62 in a full screen mode. If the current setting is switched to the reduced image display setting, the live view image is not immediately reduced and displayed at the next second frame 93 but is displayed in a state where hatched mask data is superimposed on a second live view image 102 having the same size as the display screen 62 at the second frame 93. Thereby, further, at a next third frame 95, a third live view image 103 is reduced and displayed.

The mask data indicates a region (the reduction region 63 of FIG. 5) in which the reduced live view image is displayed after a part other than the region to which the live view image is applied is covered. Further, the mask data is, for example, data of a semi-transparent grey image or a semi-transparent black image, and thus the underlayer second live view image 102 can be checked. Processing of superimposing the mask data is performed by the display image generation section 39.

In such a manner, when the current setting is switched to the reduced image display setting, the second live view image 102, which has a full screen size and on which the mask data is superimposed, may be displayed. In this case, at a transient frame 92 between the first frame 91 and the second frame 93, the second live view image 102 and the first live view image 101 are present on the upper and lower sides in a state where the images are mixed. However, the display sizes of the second live view image 102 and the first live view image 101 are the same, and thus a user is unlikely to perceive the image as being unnatural. Then, at a transient frame 94 between the second frame 93 and the third frame 95, a reduced live view image 103 and the second live view image 102 with the full screen size are present on the upper and lower sides in a state where the images are mixed. However, the mask data is superimposed on the second live view image 102, whereby it is difficult to notice that the live view images having different sizes are mixed. Hence, it is possible to reduce the unnatural perception in the case where the full screen display is switched to the reduced image display.

The mask data does not have to be semi-transparent, and may be data which covers the second live view image 102. In this case, the mask data narrows a display area of the second live view image 102. Therefore, at the transient frame 92 between the first frame 91 and the second frame 93, the display sizes of the second live view image 102 and the first live view image 101 are actually different. However, there is almost no gap on an image at a boundary (dashed line portion) between the images, and thus the display is perceived more comfortably when compared with the case where the reduced live view image and the live view image with the full screen size are mixed.

The image sensor 13 outputs the imaging signals of all the lines of the effective pixel region for the live view image 61. However, when compared with the photographed image, the live view image may have a low resolution. Hence, on the premise that thinning-out reading of a predetermined number of lines is performed in advance, the delay time ΔTa may be determined. In this case, when the blanking time period $T_{BL}$ is intended to be set through thinning-out reading, the number of lines to be subjected to thinning-out reading may increase. Further, if the blanking time period $T_{BL}$ is set in another method such as pixel mixing, thinning-out reading for a predetermined number of lines may be performed, and pixel mixing may be further performed in accordance with the set blanking time period $T_{BL}$.

In the embodiment, liquid crystal displays are used in the first display section 17 and the second display section 18. However, instead of the liquid crystal displays, other display devices such as organic EL displays may be used.

In the embodiment, the image capture lens 12 is a zoom lens, but a configuration of the image capture lens 12 may be arbitrary. That is, the image capture lens 12 may be a single focus lens. Further, the image capture lens 12 may be an interchangeable type, and may be a fixed type.

In the embodiment, the imaging device 10 is a digital camera, but the present invention can be applied to a smartphone, a tablet terminal, and the like. The smartphone or the like does not have an exclusive electronic view finder such as the first display section 17. Hence, in general, the display such as the second display section 18 functions as an electronic view finder. However, the method of controlling synchronization between the display and the image sensor 13 is the same as that of the embodiment.

The smartphone or the like includes an operation section formed by a touch panel provided on the display. However, this does not have a direct effect on the method of controlling synchronization. That is, a form of the operation section 23 is arbitrary, and respective sections of the operation section 23 do not necessarily have to be physical switches and buttons.

Although the present invention has been fully described by the way of the preferred embodiment thereof with reference to the accompanying drawings, various changes and modifications will be apparent to those having skill in this field. Therefore, unless otherwise these changes and modifications depart from the scope of the present invention, they should be construed as included therein.

What is claimed is:

1. An imaging device comprising:
    an image sensor that captures an image of a subject and outputs an imaging signal for generating a plurality of live view images, each of the plurality of live view images being generated for each single frame period of a plurality of frame periods;
    an electronic view finder that has a display screen with a predetermined size and displays reduced live view images on the display screen; and
    a processor configured to execute a process of:
        generating the live view images on the basis of the imaging signal;
        setting a viewing angle for the subject displayed on the display screen of the electronic view finder;
        generating the reduced live view images which are obtained by reducing the live view images and displayed on the display screen on the basis of the set viewing angle;
        synchronizing, in a delay time shorter than the single frame period, timing of performing display on the electronic view finder with timing of driving the image sensor, and sequentially displaying the reduced live view images on the display screen; and
        setting a blanking time period corresponding to the set viewing angle at an end of the single frame period, completing reading of the imaging signal before start of the blanking time period, and completing the reading of the imaging signal before timing at which the processor uses the imaging signal, thereby maintaining synchronization between the timing of driving the image sensor and the timing of performing display on the electronic view finder.

2. The imaging device according to claim 1, wherein the processor is further configured to set the blanking time period by reducing a time period of reading the imaging signal in accordance with the blanking time period, and maintains synchronization between the image sensor and the electronic view finder.

3. The imaging device according to claim 2, wherein the processor is further configured to set the blanking time period by performing thinning-out reading which thins out and outputs the imaging signals from the image sensor.

4. The imaging device according to claim 3, wherein the processor is further configured to perform the thinning-out reading in units of lines of a plurality of arranged pixels.

5. The imaging device according to claim 2, wherein the processor is further configured to set the blanking time period by increasing an operation clock of a circuit for reading the imaging signal so as to reduce the time period of reading the imaging signal.

6. The imaging device according to claim 2, wherein the processor is further configured to set the blanking time period by reducing a data bit length of the imaging signal so as to reduce the time period of reading the imaging signal.

7. The imaging device according to claim 2, wherein the processor is further configured to set the blanking time period by performing pixel mixture reading, which reads mixture of signals of two or more pixels, so as to reduce the time period of reading the imaging signal.

8. The imaging device according to claim 1, wherein the processor is further configured to set the blanking time period by extending the single frame period.

9. The imaging device according to claim 1, wherein the processor is further configured to reduce a time period of reading the imaging signal through combination between extending of the single frame period and at least one of thinning-out reading, increasing of an operation clock, reducing of a data bit length of the imaging signal, and pixel mixture reading, and
    wherein in the case where a plurality of photography modes is provided in advance, the combination between the extending of the single frame period and at least one of the thinning-out reading, the increasing of the operation clock, the reducing of the data bit length of the imaging signal, and the pixel mixture reading is set in advance for each of the photography modes.

10. The imaging device according to claim 1, wherein in the case where a state that the live view image is displayed on the display screen in a full screen mode is switched to a state that the live view image is reduced and displayed on the display screen, in at least one frame previous to frames for displaying the reduced and displayed live view image, mask data for indicating a region for the reduced and displayed live view image is superimposed and displayed, by the processor, on the live view image with a full screen size.

* * * * *